United States Patent
Van Paepegem

(10) Patent No.: US 6,647,504 B1
(45) Date of Patent: Nov. 11, 2003

(54) SYSTEM AND METHOD FOR OUTPUTTING A SAMPLE USING A TIME STAMP PREDICTED AT A RECEIVING STATION COUPLED TO AN OUTPUT STATION VIA A VARIABLE LATENCY BUS

(75) Inventor: Ludovic A. J. Van Paepegem, Leuven (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/451,275

(22) Filed: Nov. 30, 1999

(30) Foreign Application Priority Data

Dec. 2, 1998 (EP) .............................. 98204070

(51) Int. Cl.$^7$ ................................. H04L 7/00
(52) U.S. Cl. ...................... 713/400; 713/500; 370/350; 370/394
(58) Field of Search ................. 713/400, 401, 713/500; 370/350, 252, 394, 474, 468

(56) References Cited

U.S. PATENT DOCUMENTS

| | | | | |
|---|---|---|---|---|
| 5,299,196 A | * | 3/1994 | Allen, Jr. ..................... | 370/462 |
| 5,394,395 A | * | 2/1995 | Nagai et al. ............... | 370/395.4 |
| 5,640,388 A | * | 6/1997 | Woodhead et al. ......... | 370/468 |
| 5,717,704 A | * | 2/1998 | Rosenfeld ................... | 714/712 |
| 5,822,317 A | * | 10/1998 | Shibata ....................... | 370/394 |
| 6,175,871 B1 | * | 1/2001 | Schuster et al. ............ | 370/252 |
| 6,246,684 B1 | * | 6/2001 | Chapman et al. ........... | 370/363 |
| 6,259,677 B1 | * | 7/2001 | Jain ............................ | 370/252 |
| 6,351,471 B1 | * | 2/2002 | Robinett et al. ............ | 370/468 |
| 6,373,834 B1 | * | 4/2002 | Lundh et al. ............... | 370/310.2 |

FOREIGN PATENT DOCUMENTS

JP 10257096 A * 9/1998 ........... H04L/12/56

OTHER PUBLICATIONS

Rudolf F. Graf, "Modern Dictionary of Electronics", 1998, Howard W. Sams & Company, Sixth Edition, Page(s): 547.*
Cobb, J.A.; Gouda, M.G.; El Nahas, A.; "Time–shift scheduling: fair scheduling of flows in high speed networks" Network Protocols, 1996. Proceedings., 1996 International Conference on , Oct. 29–Nov. 1, 1996 Page(s): 6–13.*

* cited by examiner

Primary Examiner—Thomas Lee
Assistant Examiner—James K. Trujillo

(57) ABSTRACT

A programmable computer receives samples of an input signal and outputs the samples under program control. Desired output time points for the samples are determined with respect to a time-base defined by the input signal. The samples are output with a timing determined by an output timer which is asynchronous to that time base. The program reads the output timer via a variable latency bus, which does not provide real time samples of the output timer. The program estimating parameters of the output timer by an averaging process using timer values read from the output timer. The program predicts future time values of the output timer dependent on the output time point and at least one parameter and generates time-stamps from the future time values. The samples are output when the output timer reaches the computed time stamps.

10 Claims, 1 Drawing Sheet

SYSTEM AND METHOD FOR OUTPUTTING A SAMPLE USING A TIME STAMP PREDICTED AT A RECEIVING STATION COUPLED TO AN OUTPUT STATION VIA A VARIABLE LATENCY BUS

FIELD OF TECHNOLOGY

BACKGROUND AND SUMMARY

The invention relates to a system and method for generating a real-time signal.

An example of a real-time signal is a clocked stream of audio samples of which should a sample be output every clock period. It is desirable to process such a real-time signal with a modular system in which various separate stations that handle the samples are connected via a bus.

In computer systems arbitrated busses, such as the PCI bus, are a convenient means for communicating information between stations connected to such a bus. For processing real-time signals a complicating factor is that arbitrated busses are variable latency busses. Generally, a variable latency bus has an apriori unpredictable delay between the time the input station first attempts to supply information to the bus and the time when the receiver receives the information. Such an unpredictable delay may for example be caused by arbitration of access to the bus.

For various reasons it is desirable to implement signal processing as much as possible by means of programs in programmable computers, such as a PC. However, in programmable computers the delays are particularly unpredictable, because timing aspects such as delays over the bus are to a large degree made invisible from the program, for example in order not to burden programmers with timing problems.

Even the time value of timers cannot be related to the time of execution of instructions because it is desirable that the timers, which are used in the stations to time the output real-time signal, communicate only via the bus, so as to minimize the connections between the stations.

Amongst others it is an object of the invention to provide for a system for generating a real-time signal using a programmed processor and an output station that are connected via a variable latency bus.

The system according to the invention is set forth in claim 1.

As a result of using a variable latency bus, a computer program that handles a real-time signal cannot assume that the time at which it executes an instruction to supply sample via a variable latency bus has any fixed relation to the time the sample arrives at its destination station. If the program reads a timer value from another station via a variable latency bus, it cannot be sure of the time point for which this timer value holds.

The problem of an uncertain delay between executing the instruction to supply the sample and its arrival is solved in a known way by adding a so-called time-stamp to the sample. The time stamp represents a time-value of a time counter at which the sample should be reproduced at an output station. The time-stamp makes the exact time of arrival of the sample irrelevant.

However, using a time-stamp means that the program must know the timer value that will be assumed by the output timer of the output station, without being able to read the timer value of the output timer at known time points, due to the variable latency bus. To overcome this problem, the program uses a prediction algorithm for predicting the timer values given time points defined in terms of the signal. Parameters used in this prediction algorithm are for example a factor and an offset between a local time value at a time point and a predicted time value of the output timer at that time point. The program estimates these parameters by reading the timer value of the output timer a number of times via the bus, by comparing the read values to the predicted ones and by adjusting the factor and offset used in the prediction according to the averaged prediction error.

These and other advantageous aspects of the method and system according to the invention will be described using the drawing.

DETAILED DESCRIPTION

Figure 1:
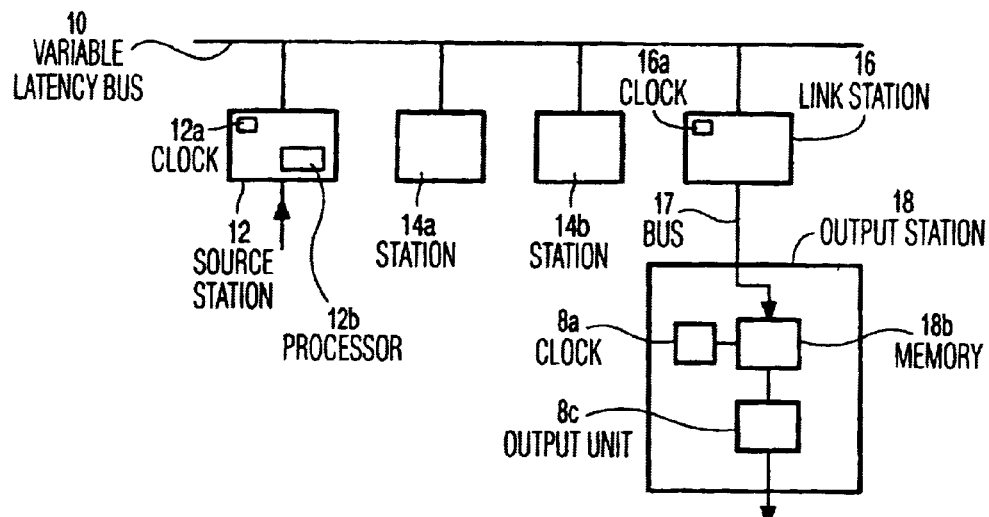
FIG. 1 shows a system with a bus

FIG. 1 shows a system with a number of stations connected via a bus 10, for example a PCI bus. The system contains a signal source station 12, further stations 14a,b and a link station 16. The source station 12 contains a local clock counter 12a. The link station 16 is connected to an output station 18 for example via a further bus 17 (for example a P1394 bus). The link station 16 and the output station 18 contain synchronized clock counters 16a, 18a. The output station 18 furthermore contains a buffer memory 18b coupled to the further bus 17 and the clock counter 18a. The output station 18 contains an output unit 18c coupled to the buffer memory 18b.

In operation the signal source station 12 produces a source signal. This source signal is communicated to the output station 18, which reproduces as a real time signal. The source signal contains for example a sequence of samples for periodically recurring time points.

The signal source station 12 packages the source signal into a series of messages. The messages are transferred to the link station 16 via bus 10. In order to transfer a message, the source station 12 needs to gain access to the bus 10. In a variable latency bus 10 this access is granted at an apriori undetermined point in time. The point in time at which access is granted depends for example on whether the other stations have requested access. Upon grant of access to the signal source station 12, the message is transferred to the link station 16 which transfers the message to the output station 18 within a predetermined time.

The output station 18 needs to know the time when to reproduce the samples. This requires communication with the source station 12 because the clock counter 18a of the output station 18 is independent of the local clock 12a of the source station 12. If the output station 18 were to output the samples simply every time its own clock counter 18a increments by a fixed amount, buffer overflow or underflow would occur when the samples might be output at a slower or faster rate respectively than they are generated by the source station 12.

In order to prevent such problems, the source station 12 associates time stamps with the messages. In the output station 18, the message is stored in buffer memory 18b. The output station 18 reads the time-stamp from the message and compares the time-stamp with the clock count in the clock counter 18a. Once the clock count has passed the timestamp, the message is fed to the output unit 18c which generates the real-time signal from the information in the message.

This still leaves the problem of selecting the time-stamps at the source station 12, which is complicated by the fact that the source station preferably only has access to the clock counter 18a via a variable latency bus, so that it is impossible for the source station 12 to determine the time points at which samples of the clock counter 18a are taken.

The signal source station 12 contains a programmed processor to select the time-stamps so that the output station 18 will reproduce the samples according to the time points defined for the signal.

Figure 2:
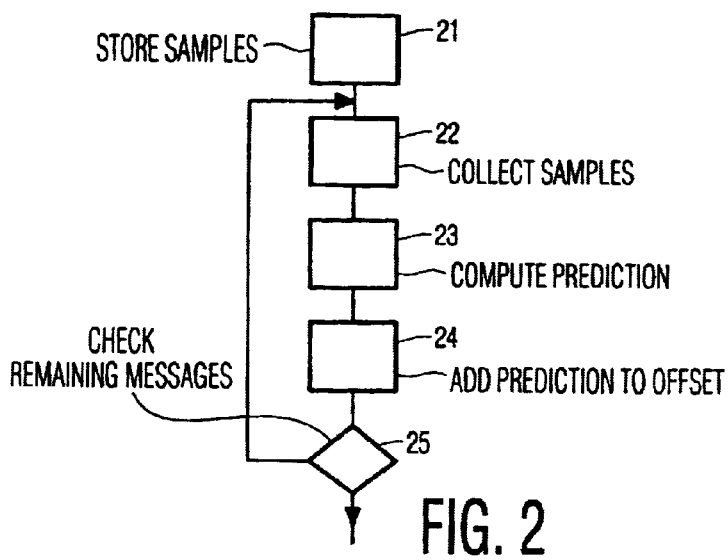
FIG. 2 shows a flow chart for selecting time stamps
Figure 3:
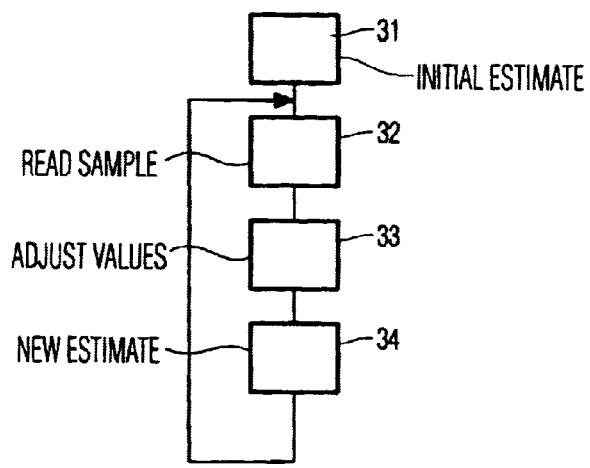
FIG. 3 shows a further flow chart for selecting time stamps.

FIGS. 2 and 3 shows a flow-chart of a program for selecting the time-stamps. The program contains two processes.

FIG. 2 shows a flow chart of the actual time-stamp selection process. In this process a number of messages is handled. In a first step 21 of the flow-chart the processor 12b stores a number of signal samples in a memory. The samples apply for example to time points ti at regular intervals dt: $ti=t0+i*dt$, the samples being stored at successive positions in memory, so that the position in memory depends on i.

In a second step 22 the processor collects samples into a message and determines the desired output time-point of a sample in a given message. This time-point is for example the time-point of arrival of the sample, plus a delay that is a sum of
- a delay for processing in the source station;
- a worst case delay of transmission over the variable latency bus;
- a delay for transmission from the link station to the output station;
- a delay for processing in the output station.

The delays are taken the same for all samples.

For a sample stored at a memory position corresponding to index i, the time point "si" is for example computed as $si=s0+i*dt$. As a result, the second step expresses the output time-point as a number si. The computation of si is asynchronous in that it can be performed at any reasonable time and depends merely on a memory index i.

In a third step 23 the number si representing the desired output time-point is used by the processor to compute a prediction Pi of the clock counter value of the output clock 12a at that output time-point. This prediction Pi is computed for example as $Pi=a*si+b$, using two parameters a, b which will be discussed later.

In a fourth step 24, the processor adds the prediction Pi to a fixed offset, as required by the delay for processing in the output station and any transmission between the output station and an eventual output. The result of this addition is stored with the message as a time-stamp. Subsequently in a fifth step 25 the processor tests whether there are any messages left and if so the flow chart is repeated from the second step for those messages. At a later time the messages are transmitted, dependent on the memory position of the samples in the message or on receiving a request for a message from the output station.

In the example where the samples correspond to periodically recurring time points $ti=t0+i*dt$, the predictions may be computed incrementally: $P(i)=P(i-1)+a*dt$. In this case the increment $a*dt$ is the only parameter needed for predicting Pi.

The third step 23 of the flow-chart of FIG. 2 requires prediction parameters a, b.

FIG. 3 shows a flow chart of a process for estimating these parameters. In a first step 31 the processor makes an initial estimate of these parameters. For example by reading the output clock counter 12a twice via the variable latency bus 10. This yields two samples M1, M2 of the output clock counter 12. The processor determines corresponding clock counts t1, t2 of its local clock counter for these samples, for example by sampling its local clock counter after sending a request for a sample of the output clock counter 12a or upon reception of a sample of the output clock counter 12a. From this an initial estimate may be set at $a=(M2-M1)/(t2-t1)$ and $b=M2-a*t2$ or $b=(M1+M2-a*(t1+t2))/2$. The processor assigns the sample M2 to a variable My holding the last previous sample of the output clock counter and the sample t2 is assigned to a variable ty holding the last previous sample of the local clock counter.

In a second step 32 of the flow-chart, the processor reads a further sample Mx of the output clock counter 12a via the variable latency bus 10 and determines a corresponding clock count tx of its local clock counter. In a third step 33, the processor adjusts the values for one or both of the parameters a and b by using the average of the error measured so far between the samples Mx and the predictions (Mpred=$a*tx+b$) for it, computed from tx by using a and b.

The average may be computed as a running average of counter value increments, for example as follows $$\text{new } a = \text{old } a + f*(Mx - My - \text{old } a*(tx-ty))$$

where f is a factor which may be set at a constant value selected to control the speed with which a changes. For example, if successive samples tx, ty of the clock counter are on average dt apart and it is desired that "a" changes appreciably only at a timescale of N (e.g. N=10) samples, then f may be set to $1/(N*dt)$. Alternatively, one start with a variable $f=1/(tx-t0)$ with f0 the time at the start of the program, and keep f constant at $1/(N*dt)$ once $tx-t0>N*dt$. The precise value of f is not critical for the invention, as long as it is made sufficiently small to avoid stability problems associated with the recursive nature of the expression used to compute "a".

Similarly, one may compute values for "b" according to $$\text{new } b = \text{old } b + f2*(Mx - \text{new } a*tx - \text{old } b)$$

Where for example f2 is equal to 1/N. However, without deviating from the invention one may restrict update to "a" only, keeping "b" constant or to "b" only, keeping "a" constant. Instead of the simple terms $f*(\ldots)$, one may use more complicated terms, linearly combining for example M values from a number of tample times, or using non-linear functions.

If the samples are taken periodically tx-ty will be fixed and "a" can be updated by multiplication with fixed factors. Fixed factors may be used even if tx-ty is only approximately fixed.

In a fourth step 34 of the flow-chart the new estimate of the parameter or parameters a and/or b is used to replace the previous estimates, so that they can be used in the third step 23 of FIG. 2.

After the fourth step 34, the flow-chart is repeated starting with the second step 32. In principle, the update process for a and/or b can run forever. If desired, the update process may be terminated once the program stops transmission of messages.

FIGS. 2 and 3 show the process of time-stamp computation and parameter estimation as parallel programs, but of course the steps involved in these processes can also be performed as part of a single program, which samples the clocks between computing time-stamps. What is essential in the embodiment of FIGS. 2 and 3 is that a program computes the time-stamps at a time that is not related to the time of outputting the corresponding messages, by obtaining estimates of one or more parameters a, b for computing the times stamp from samples of various clock counters.

Some processors contain hardware that allows adjustment of a clock frequency of the local clock counter under program control. In such processors, the invention may be realized at least partly by including program instructions that adjust the frequency of the local clock counter that is used to obtain the samples t1, t2, tx etc. With a sufficiently refined control over the clock frequency, it may suffice to adjust the clock frequency, for example so that the change in frequency is df=Q(g*(Mx−a*tx−b)) where a and b are fixed and Q is a quantization function that quantizes to frequencies to which the clock can be adjusted. If the quantization step is too coarse, the frequency adjustment may be combined with updates to a and/or b as described above and additionally adjusting "a" by the inverse of the factor with which the frequency is adjusted.

What is claimed is:

1. A signal processing system for outputting a real-time signal, the system comprising:

a receiving station for receiving a signal defining a sample and for determining a desired output time point for the sample in terms of a time-base defined by the signal, the receiving station using the desired output time-point to determine a time-stamp for the sample;

a variable latency bus;

an output timer coupled to the receiving station via the bus, the output timer being asynchronous to the time-base;

an output station for outputting the sample when the output timer reaches a predetermined time value relative to the time stamp, a processor in the receiving station, programmed with a program for determining the time stamp from a future time value of the output timer, the future time value being predicted dependent on the output time point and at least one parameter, but otherwise independent of the time at which the program is executed for the sample, the program estimating the at least one parameter by averaging using timer values read from the output timer via the bus.

2. A system according to claim 1, wherein the program predicts the future time value from an offset plus a time value at the time point multiplied by a factor, the factor and/or the offset being the parameters that are obtained by averaging using timer values.

3. A system according to claim 2, wherein the factor and/or the offset are adjusted by a running average of errors between read and predicted timer values and/or timer value increments.

4. A system according to claim 1, wherein the signal contains a sample sequence for periodically succeeding output time points, the program computing the time-stamp for the sample by adding an increment to a preceding time-stamp of a preceding sample, the increment being obtained by averaging using timer values.

5. A system according to claim 4, wherein the processor reads timer values of the output timer upon arrival of samples, and compares the timer values to timer values of the output timer predicted for the time points determined for these samples, an error between the predicted timer values and the sampled timer values being used to correct the at least one of the parameters.

6. A method of generating a real-time signal, the method comprising receiving a signal defining a sample;

determining a desired output time point for the sample with respect to a time-base defined by the signal;

in response to receiving the signal computing a time-stamp for the sample with respect to an output timer which is asynchronous to the time base, by means of a computer program which predicts a future time value of the output timer dependent on the output time point and at least one parameter, but otherwise independent of the time at which the program is executed for the sample, the program estimating the at least one parameter by averaging using timer values read from the output timer;

outputting the sample when the output timer reaches a predetermined time value relative to the time stamp.

7. A method according to claim 6 wherein the timer values from which the at least one of the parameters is estimated are read via a variable latency bus.

8. A method according to claim 7, wherein the program predicts the future time value as a factor multiplied by a time value at the time point plus an offset, the factor and/or the offset being parameters that a re estimated by averaging using timer values.

9. A method according to claim 8, wherein the signal contains a sequence of samples for periodically succeeding output time points, the time-stamp being computed by adding an increment to a preceding time-stamp of a preceding sample, the increment being estimated by averaging using timer values.

10. A method according to claim 9, wherein timer values of the output timer are read upon arrival of samples, and the timer values and/or their increments being compared to timer values of the output timer and or their increments, predicted for the time points determined for these samples, an error between the predicted timer values and the sampled timer values and/or their increments being used to correct the at least one of the parameters.

* * * * *